United States Patent
Higashiwaki et al.

(10) Patent No.: US 9,409,239 B2
(45) Date of Patent: Aug. 9, 2016

(54) DRILL BIT

(75) Inventors: Hirofumi Higashiwaki, Mie (JP); Eiji Hashimoto, Chiba (JP); Manabu Saito, Tokyo (JP); Masao Watanabe, Tokyo (JP); Tatsuo Nakahata, Tokyo (JP)

(73) Assignees: MAKOTOLOY CO., LTD., Osaka (JP); FUJI JUKOGYO KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 13/489,938

(22) Filed: Jun. 6, 2012

(65) Prior Publication Data

US 2012/0321403 A1    Dec. 20, 2012

(30) Foreign Application Priority Data

Jun. 17, 2011 (JP) .................. 2011-135153

(51) Int. Cl.
*B23B 51/02* (2006.01)
*B23B 51/00* (2006.01)

(52) U.S. Cl.
CPC ........... *B23B 51/009* (2013.01); *B23B 2222/04* (2013.01); *B23B 2222/88* (2013.01); *B23B 2226/275* (2013.01); *B23B 2251/04* (2013.01); *B23B 2251/14* (2013.01); *B23B 2251/18* (2013.01); *B23B 2251/204* (2013.01);
(Continued)

(58) Field of Classification Search
CPC ........... Y10T 408/905; Y10T 408/906; Y10T 408/9065; B23B 51/009; B23B 2251/04
USPC ......................................... 408/223, 224, 225
IPC ........................................................ B23B 51/02
See application file for complete search history.

(56) References Cited

U.S. PATENT DOCUMENTS

| 155,044 A | * | 9/1874 | Robertson ............... G04B 15/08 368/132 |
| 1,309,706 A | * | 7/1919 | Taylor ............................ 408/230 |
| 1,387,994 A | * | 8/1921 | Lewis ............................ 408/224 |

(Continued)

FOREIGN PATENT DOCUMENTS

| CN | 2231586 | 7/1996 |
| CN | 201020814 | 2/2008 |

(Continued)

OTHER PUBLICATIONS

Office Action issued in Japanese Application No. 2011-135153 mailed Mar. 3, 2015 (with English translation).

(Continued)

*Primary Examiner* — Sunil K Singh
*Assistant Examiner* — Michael Vitale
(74) *Attorney, Agent, or Firm* — Smith, Gambrell & Russell, LLP

(57) ABSTRACT

Provided is a step-shaped drill bit including at least two stepped cutting edges that are axially provided. A cutting edge of a first step from a tip is formed so as to satisfy at least one of the following conditions. That is, a number of blades is smaller, a point angle of the cutting edge is larger, or a clearance angle of the cutting edge is larger than that of cutting edges of a second and subsequent step(s). As a result, a thrust resistance during a perforation can be reduced compared with a case in which the first step cutting edge is formed such that the number of blades, the point angle of the cutting edge and the clearance angle of the cutting edge are the same as those of the second and subsequent step(s).

20 Claims, 12 Drawing Sheets

(52) U.S. Cl.
CPC .......... *Y10T408/905* (2015.01); *Y10T 408/906* (2015.01); *Y10T 408/9065* (2015.01)

(56) References Cited

U.S. PATENT DOCUMENTS

| | | | | |
|---|---|---|---|---|
| 2,193,186 | A * | 3/1940 | Bannister | 408/223 |
| 2,389,909 | A * | 11/1945 | Hofbauer | 408/224 |
| 4,411,563 | A * | 10/1983 | Moon | 407/54 |
| 4,480,952 | A * | 11/1984 | Jeremias | 408/224 |
| 5,312,208 | A * | 5/1994 | Shiga et al. | 408/224 |
| 5,718,542 | A * | 2/1998 | Basteck | B23D 77/02 408/1 R |
| 6,056,485 | A * | 5/2000 | Magill | B23C 5/10 407/54 |
| 6,547,495 | B2 * | 4/2003 | Meece | B23D 77/00 408/1 R |
| 7,665,989 | B2 * | 2/2010 | Brajnovic et al. | 433/165 |
| 2003/0202853 | A1 * | 10/2003 | Ko et al. | 408/225 |
| 2011/0135413 | A1 * | 6/2011 | Hobohm | B23D 77/00 408/1 R |

FOREIGN PATENT DOCUMENTS

| | | | |
|---|---|---|---|
| CN | 201565643 | 9/2010 | |
| CN | 201823976 | 5/2011 | |
| DE | 29919858 U1 * | 4/2000 | ............. B23B 51/00 |
| FR | 2124857 A | 9/1972 | |
| JP | 2008-36759 | 2/2008 | |
| JP | 2010-240835 | 10/2010 | |
| RU | 1815008 A1 * | 5/1993 | ............. B23B 51/02 |
| WO | WO 2009066935 A1 * | 5/2009 | ............. A61C 3/02 |

OTHER PUBLICATIONS

Office Action issued in Chinese Application No. 201210204957.9, mailed Jul. 3, 2015 (with English translation).

Office Action issued in Japanese Application No. 2011-135153, mailed Sep. 8, 2015 (with English translation).

Office Action issued in Chinese Patent Application No. 201210204957.9, mailed Mar. 29, 2016.

* cited by examiner

DRILL BIT

CROSS-REFERENCE TO RELATED APPLICATION

The present application claims a priority under the Paris Convention of Japanese Patent Application No. 2011-135153 filed on Jun. 17, 2011, which shall be a basis of correction of an incorrect translation.

BACKGROUND

1. Field of the Invention

The present invention relates to a drill bit having step-shaped cutting edges that are axially provided.

2. Description of Related Art

A drill is a known tool used as a perforation tool. A two-edge drill bit is frequently used (see Patent Document JP2008-36759A, for example).

A typical conventional drill bit ("drill bit" is also designated as "drill" hereinafter) has two cutting blades having a specified point angle at a tip of the drill bit shown as a drill bit B in FIGS. 10 and 11.

On the other hand, it is required in various industry fields to perforate a work piece W to be perforated, in which a metal material W1 and a fiber reinforced resin composite material W2 are laminated as shown in FIGS. 10 and 11, by one drill all at once. That is because a fiber reinforced resin composite material for reduction of weight and a metal (plate) material disposed on an inner surface or an outer surface of the composite material are to be perforated and a connection member such as a bolt, etc. is to be inserted so as to structure the composite structure by combining these materials. Therefore, it is required to perforate each material at a corresponding position precisely and efficiently. Aluminum is an example as the metal material W1 and a carbon fiber reinforced resin composite material is an example of the fiber reinforced resin composite material W2.

Various kinds of materials can be included as a work piece W. For example, the metal material W1 is formed of a plurality of layers, the fiber reinforced resin composite material W2 is formed of a plurality of layers, or different material layers are piled up in each case. And a drill that can be applicable in any case is desirable.

It is desirable to hold the work piece W using holding tools CL at a position apart from the perforating position, as shown in FIGS. 10 and 11, for holding the work piece W during a perforation work. It is not desirable to put a support material on a side that the drill will penetrate. That is because it causes demerits such as material wasting, additional perforation work and additional drill cuttings.

In the case a work piece to be perforated is composed of a metal material W1 disposed on one side and a fiber reinforced resin composite material W2 disposed on the other side, as shown in FIGS. 10 and 11, it is possible to select a perforation direction from a metal material W1 side or a resin composite material W2 side. However, at a manufacturing site of structures using such a composite member, at an aircraft factory for example, it is not necessarily possible to select the perforation direction from a viewpoint of a structure itself or a positional relation to other surrounding members. Thus a drill that is able to perforate a work piece excellently from either direction is requested.

As shown in FIGS. 10 and 11, when perforating the work piece W from the side of the fiber reinforced resin composite material W2 using a typical conventional drill bit B having two cutting blades having a specified point angle at a tip of the drill, following phenomena can be seen.

At first, as shown in FIG. 10A, the drill B perforates the fiber reinforced resin composite material W2 and the drill is advanced to the tip direction.

When the tip of the drill B reaches to the metal material W1, the drill B makes the metal material W1 bend and swell toward the tip direction while the perforation of the metal material W1 proceeds, as shown FIG. 10B and then FIG. 10C. At this point, since drill cuttings tend to become linked and long, there is a concern whether or not the drill cuttings of metal can be ejected (cleared) smoothly toward the rear of the drill B through the perforated hole in the fiber reinforced resin composite material W2. In the case where the drill cuttings are not ejected smoothly, cutting efficiency will be decreased. In addition, it will be a problem if drill cuttings be remained between the metal material W1 and the fiber reinforced resin composite material W2.

After that, the tip of the drill B reaches to the surface of the metal material W1 and makes a small hole thereon. Then the metal material W1 purposes to return to the original position, as shown in FIG. 11A, by virtue of a tension generated in the metal material W1 caused by the bending deformation. There is a concern at this time that the drill is stopped or the cutting blade is damaged by the sharply increased load to the drill. And also there is a problem that such a hole perforated and returned from bending cannot be finished with high precision. The drill B does not have a finishing edge to finish the hole on the metal material W1 at the time shown in FIG. 11A. Thus it becomes necessary to finish the hole after perforation by the drill B. After that, as shown in FIG. 11B, the maximum diameter portion of the cutting blade of the drill B cuts through the metal material W1 to complete the perforation process.

There is a concern, when using the typical conventional drill B to perforate the work piece W from either the metal material W1 side or the composite material W2 side, that delamination of the composite material W2 may occur and it is difficult to finish the hole precisely. Thus there is a limitation of high precision perforation of the metal material W1 or the composite material W2.

The degree of bending of the metal material W1 when it bends toward the tip direction of the drill depends on characteristics of the drill as well as characteristics of the metal material W1.

Table 1 shows a degree of bending (mm) of the metal material W1 under the following conditions.

Table 1 shows a maximum degree of bending of the metal material W1 under combined conditions selected from materials of an aluminum (A7075) and titanium alloy (6-4Ti), thickness of the metal material W1 of 3 (mm) and 4 (mm), and the diameter of the drill B of 4 (mm) and 5 (mm). The metal material W1 bends in accordance with the movement of the tip of the drill B as shown by FIGS. 10B and 10C; however, the degree of bending shown in Table 1 means the maximum displacement of the metal material W1 in the drill axis direction. A distance S between the holding tools CL in FIG. 10A was 100 (mm) and an advancing speed of the drill was set at 0.15 (mm/rev).

As can be seen by Table 1, the degree of bending of the metal material W1 at perforation by the drill in the case using titanium alloy (6-4Ti) becomes larger than the case using aluminum (A7075). And the degree of bending becomes large as the thickness of the metal material W1 becomes thin. The results are caused by the bending rigidity of the metal material W1.

On the other hand, the degree of bending of the metal material W1 at perforation becomes large as the drill diameter becomes large. That is because a force to bend the metal material W1, that is a thrust force, becomes large as the drill diameter becomes large.

TABLE 1

| Degree of bending (mm) | | φ4 twist | φ5 twist |
|---|---|---|---|
| W1 thickness 3 mm | A7075 | 0.561 | 0.693 |
| | 6-4Ti | 0.586 | 0.725 |
| W1 thickness 4 mm | A7075 | 0.236 | 0.292 |
| | 6-4Ti | 0.274 | 0.3 |

SUMMARY

The present invention was made considering the prior art explained above and an object of the invention is to provide a drill bit that can perforate a work piece, which a metal material and a fiber reinforced resin composite material are piled up, all at once stably and precisely for a long time.

Accordance to a first aspect of the present invention, a step-shaped drill bit is provided that includes at least two stepped cutting edges that are axially provided. A cutting edge of a first step from a tip is formed so as to satisfy at least one following conditions. They are: a number of blades is smaller than that of cutting edges of a second and subsequent step(s), a point angle of the cutting edge is larger than that of cutting edges of a second and subsequent step(s), or a clearance angle of the cutting edge is larger than that of a cutting edge(s) of a second and subsequent step(s). As a result, a thrust resistance during a perforation can be reduced compared with a case in which the first step cutting edge is formed such that the number of blades, the point angle of the cutting edge and the clearance angle of the cutting edge are the same as those of the second and subsequent step(s).

According to a second aspect of the invention, a step-shaped drill bit is provided that includes at least two stepped cutting edges that are axially provided. A number of blades of a first step cutting edge from a tip is smaller than a number of blades of a second and subsequent step(s). As a result, a thrust resistance during a perforation can be reduced compared with a case in which the number of blades of the first step is the same as that of the second and subsequent step(s).

According to a third aspect of the invention, a step-shaped drill bit is provided that includes at least two stepped cutting edges that are axially provided. A point angle of a first step cutting edge from a tip is larger than a point angle of a cutting edge(s) of a second and subsequent step(s). As a result, a thrust resistance during a perforation can be reduced compared with a case in which the point angle of the first step cutting edge is the same as that of the second and subsequent step(s).

According to a fourth aspect of the invention, a step-shaped drill bit is provided that includes at least two stepped cutting edges that are axially provided. A clearance angle of a first step cutting edge from a tip is larger than a clearance angle of a cutting edge(s) of a second and subsequent step(s). As a result, a thrust resistance during a perforation can be reduced compared with a case in which the clearance angle of the first step cutting edge is the same as that of the second and subsequent step(s).

Preferably, the drill bit is provided that includes at least three stepped cutting edges that are axially provided. Each of the second and subsequent edges satisfies at least one of following conditions of: having the same or larger number of blades than that of the neighboring edge on the tip side, having the same or smaller point angle than that of the neighboring edge on the tip side, or having the same or smaller clearance angle than that of the neighboring edge on the tip side.

Preferably, an axial distance between a tip of the drill bit and the second edge is the same as or larger than a diameter of the first edge.

Preferably, the first edge is two-bladed.

Preferably, the second edge is four-bladed.

Preferably, the drill bit has a third cutting edge and the third edge is four-bladed.

Preferably, a last edge for finally enlarging a perforated hole has a point angle, at a front end thereof, smaller than a point angle of a front side edge, and the point angle decreases gradually as a ridge goes to rear end so that the ridge of the last edge forms smoothly curved profile.

Preferably, a point angle of the last edge at a rear end is zero.

Preferably, a diameter of the drill at the position where the point angle is zero is a maximum diameter.

Preferably, a difference of a minimum diameter of the last edge at a front end thereof and a maximum diameter of the last edge at a rear end thereof is not less than 1 mm.

Preferably, the last edge is a third edge of the drill bit.

According to the present invention, since two or more stepped cutting edges, which are axially disposed, are provided and a diameter of a first-step cutting edge can be smaller than a diameter of a hole to be perforated, a thrust resistance during perforation can be reduced compared with a case perforating a hole by a cutting edge having the same diameter of the hole to be perforated.

In addition, since the first-step cutting edge is formed compared with a cutting edge(s) of a second and subsequent step(s) such that the number of blade(s) is smaller, or a point angle of the cutting edge is larger, or a clearance angle of the cutting edge is larger. As a result, a thrust resistance during perforation can be reduced compared with a case in which the cutting edge of the first step is formed such that the number of blade(s), the point angle of the cutting edge and the clearance angle of the cutting edge are the same as those of the second and subsequent step(s).

Therefore, the thrust resistance during perforation by the advancing first-step cutting edge is reduced and thus it becomes possible to perforate the work piece stably with less thrust load.

Even in the case where a metal material is provided at a back side of a cutting side, a degree of bending caused by the first-step cutting edge becomes consequently smaller because the thrust resistance becomes smaller.

When the bending of the metal material returned and moved toward the rear of the drill bit, since a second-step cutting edge is disposed apart from the first-step cutting edge in an axial direction of the drill, the metal material is less prone to be contact with the second-step cutting edge and possibilities that the drill may be stopped or the second cutting edge may be damaged, by sharply increased load to the cutting edges, can be decreased. Preferably a distance between the tip of the drill and the second-step cutting edge keeps more than a diameter of the first-step cutting edge so as to make the metal material less prone to be contact with the second-step cutting edge when the bending of the metal material returned and moved toward the rear of the drill.

After perforation by the first-step cutting edge in advance, the second-step and subsequent cutting edge(s) enlarge the hole diameter and the last step cutting edge finishes the hole.

The perforation work is completed when the last step cutting edge penetrates the work piece to be perforated.

The last perforating (cutting) edge for finally enlarging the hole preferably has a point angle smaller than that of any other preceding cutting edges so as to finish the inside of the perforated hole. Especially, a ridge line of the last cutting edge is preferably formed in a smooth curve by gradually decreasing the point angle as going to the rear end of the drill bit, and the point angle at the rear end of the drill bit converges to zero. Such a structure helps preventing delamination of the fiber reinforced resin composite material and it becomes possible to work and finish the metal material and the composite material in high accuracy and improve surface roughness of the work piece.

The last perforating (cutting) edge means a cutting edge to determine a diameter of the perforated hole by penetrating through the hole. Therefore, it is arbitrary to add additional cutting edge, after the last perforating cutting edge, that chamfers the edge of the hole or makes a countersunk hole and not perforate through the work piece.

The number of the first-step cutting blades is preferably two so as to reduce a thrust resistance during perforation.

The number of the second-step cutting blades is preferably four. The reason is that the second cutting blades become damage-resistant and the drill is less prone to stop because the metal material can be received by more number of cutting blades even when the metal material becomes in contact with the second cutting blades caused by the phenomena above explained. In addition, the more the number of the cutting blades, the less delamination of the composite material occurs.

By arranging four cutting blades at the front of the last cutting edge, a high precision through hole can be perforated because the four-bladed cutting edge holds and guides the last finishing cutting edge in high axial precision by virtue of centripetal force of the four-bladed cutting edge.

The number of the last perforating cutting blades is preferably four or more so as to suppress delamination of the fiber reinforced resin composite material. The more the number of the cutting blades, the more the delamination can be suppressed because drill cuttings per one cutting blade can be reduced, the number of cutting blades per one rotation is increased and the work piece can be finely shredded. In addition, four or more last cutting blades are more preferable from the viewpoint of performing final cutting in stable and high axial precision. By selecting four or more number of cutting blades, the perforation for an accurate diameter can be maintained for a long time because drill cuttings per one cutting blade can be reduced and abrasion rate of the blade becomes slower.

The cutting edge is divided axially and thus drill cuttings of the metal material are shredded and can be ejected clearly.

The first cutting edge preferably has a small thrust resistance as explained above and the last perforating edge preferably has a small cutting resistance for a stable finishing work. To that end, one or more cutting edges may be preferably disposed between the first cutting edge and the last cutting (perforating) edge, instead of disposing the first cutting edge and the last perforating edge side by side, so as to shorten the lengths of the first and the last cutting edges and reduce the cutting resistances thereof. Even in such a case, it is preferable to enlarge the diameter of the hole in 1 mm or more by the last perforating edge so as to finish the hole sufficiently.

The work efficiency can be improved, as explained above, by making a tool life and an exchange cycle longer by preventing wearing, chipping, or the like of the tool.

According to the present invention, as explained above, it becomes possible to perforate a work piece that a metal material and a fiber reinforced resin composite material are laminated, all at once, stably and in high precision for a long time.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein;

FIGS. 6A-6C, FIGS. 8A and 8B are cross-sectional drawings of a work piece during a perforation work sequence after FIGS. 7A-7C.

DETAILED DESCRIPTION OF THE PREFERRED EMBODIMENTS

An exemplary embodiment of the present invention will be explained with reference to the drawings. However, it should be noted that the present invention is not limited to the embodiment.

Figure 1:
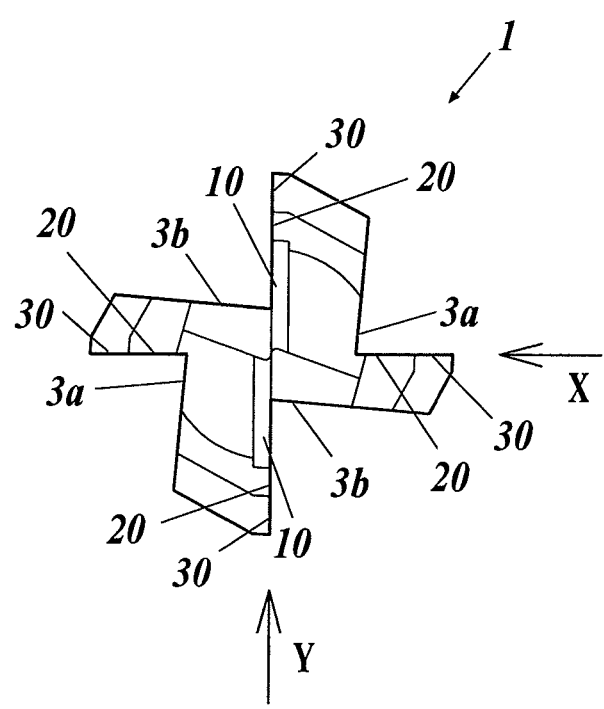
FIG. 1 is a front view of an edge of a drill bit according to an exemplary embodiment of the invention, which corresponds to a drawing viewed from Z direction in FIG. 2.
Figure 2:
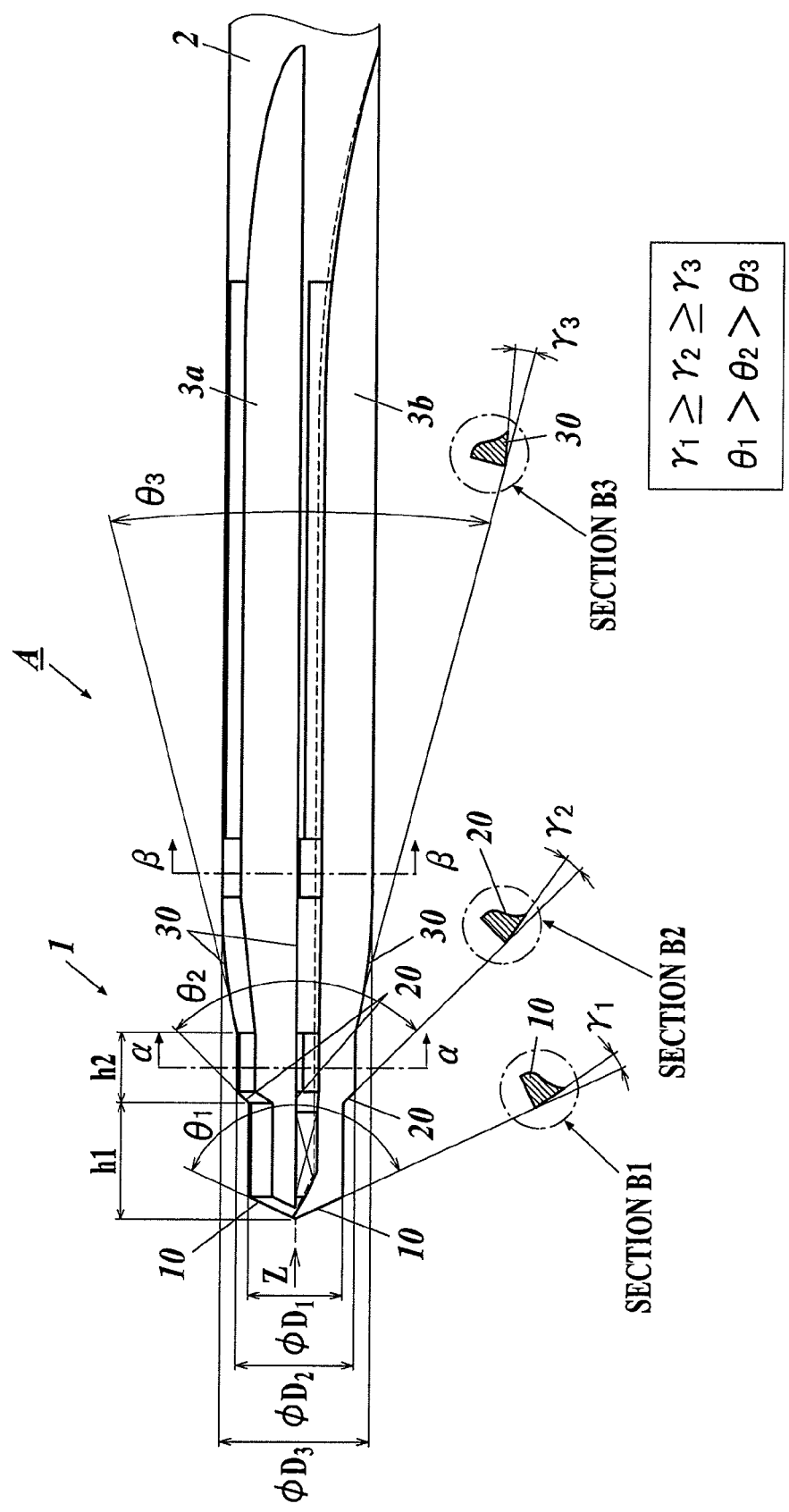
FIG. 2 is a side view from X direction in FIG. 1, and sections B1, B2 and B3 in FIG. 2 are sectional drawings of a first-step cutting edge, second-step cutting edge and third-step cutting edge, respectively.
Figure 3:
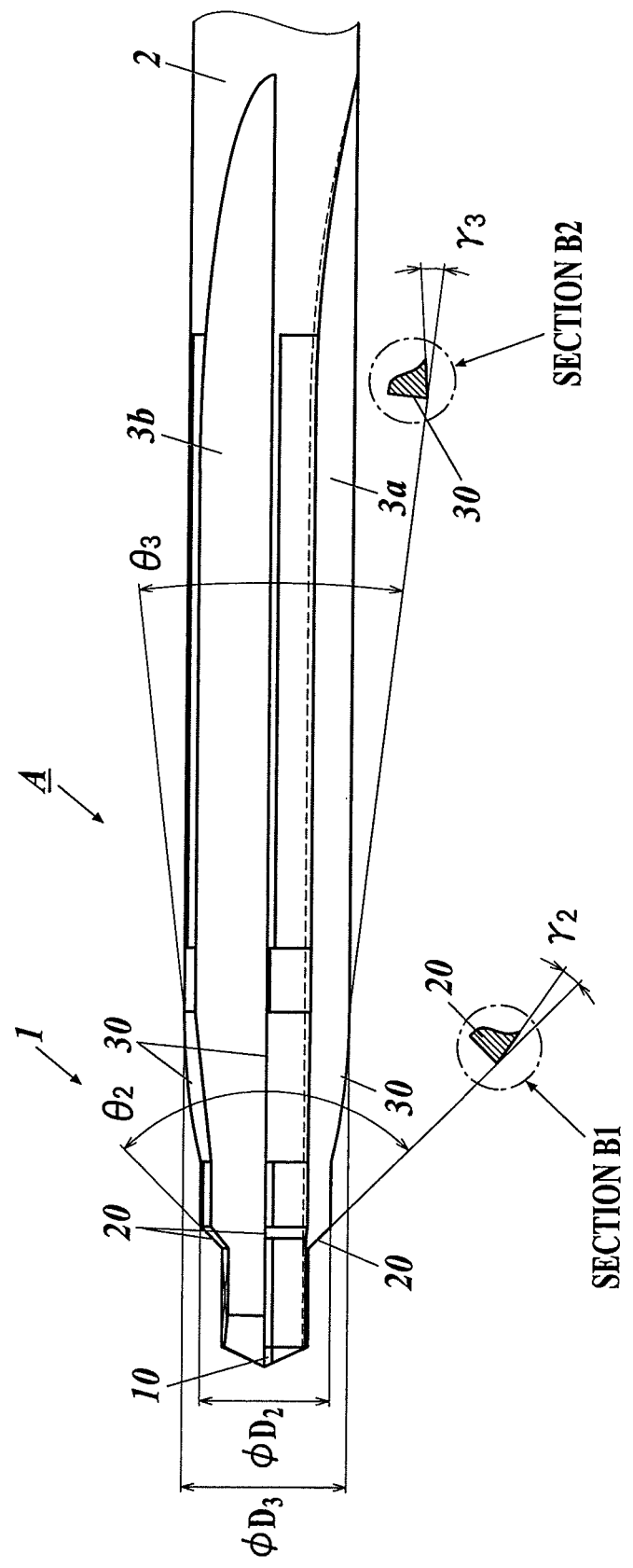
FIG. 3 is a side view from Y direction in FIG. 1, and sections B1 and B2 in FIG. 3 are sectional drawings of the second-step cutting edge and third-step cutting edge, respectively.
Figure 4A:
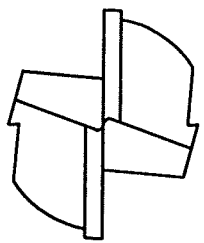
FIG. 4A is a front view from Z direction in FIG. 2 up to a portion having a diameter of $\phi D1$.
Figure 4B:
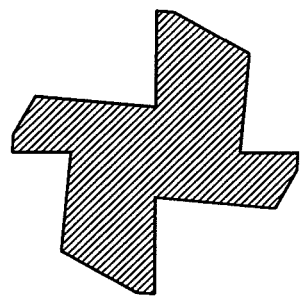
FIG. 4B is a cross-sectional view along $\alpha$-$\alpha$ line (portion of a $\phi D2$ diameter) in FIG. 2.
Figure 4C:
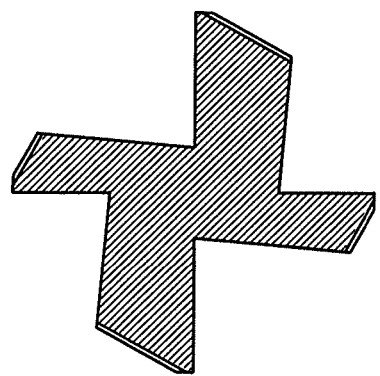
FIG. 4C is a cross-sectional view along $\beta$-$\beta$ line (portion of a $\phi D3$ diameter) in FIG. 2, FIGS. 5A, 5B and 5C are cross-sectional drawings of a work piece during a perforation work sequence using a drill according to an exemplary embodiment of the invention.

As shown in FIGS. 1 to 3, a drill A of an exemplary embodiment includes a chisel (edge) portion 1 and a shank portion 2. Four V-shaped straight flutes 3a, 3b, 3a and 3b are formed from the chisel portion 1 to the shank portion 2.

The drill A of an exemplary embodiment has three-stepped cutting edges 10, 20 and 30 that are axially divided. The first step cutting edge 10, a maximum diameter is designated as φD1, is a two-bladed edge formed at the tip of the drill and each blade is disposed at an opposite side (180 degrees apart) around the drill axis each other.

The second step cutting edge 20 has four blades, which are disposed 90 degrees apart around the drill axis each other and formed from a position at a distance of h1 apart from the tip of the drill (as shown in FIG. 2). The edge 20 has a minimum diameter of φD1 at a front end and a maximum diameter of φD2 at a rear end.

The third step cutting edge 30 has four blades, which are disposed 90 degrees apart around the drill axis each other and formed from a position at a distance of h1+h2 apart from the tip of the drill (as shown in FIG. 2). The edge 30 has a minimum diameter of φD2 at a front end and a maximum diameter of φD3 at a rear end.

Two blades among four of the second edge 20 (and also of the third edge 30) are disposed at the same positions as those of the two blades of the first edge 10.

A point angle of the first edge 10 is θ1 as shown in FIG. 2.

A point angle of the second edge 20 is θ2 as shown in FIG. 2.

A point angle of the third edge 30 is θ3 as shown in FIG. 2.

A clearance angle of the first edge 10 is γ1 as shown in section B1 in FIG. 2.

A clearance angle of the second edge 20 is γ2 as shown by section B2 in FIG. 2 and by section B1 in FIG. 3.

A clearance angle of the third edge 30 is γ3 as shown by section B3 in FIG. 2 and by section B2 in FIG. 3.

The number of the cutting blades, point angle and clearance angle of each step will be explained.

When making a drill having two or more stepped cutting edges that are axially divided, such as the drill A of an exemplary embodiment, it will not be possible to reduce thrust resistance of the first step edge 10 if the number of blades, point angle and clearance angle of each step are the same each other.

It becomes possible to reduce thrust resistance of the first step edge 10 when following conditions 1, 2 or 3 or combinations thereof are satisfied compared with the case when the number of the cutting blades, point angle and clearance angle of the first step edge are the same as those of the second or more step edges.

(Condition 1)

The condition 1 is to reduce the number of the blades of the first step edge than that of the other steps. The smaller the number of the blades, the smaller the cutting resistance becomes because total length of the blades that is in contact with a work piece becomes short. In the case where numbers of the blades at a second and subsequent steps are not the same, the number of the blades of the first step have to be smaller than the minimum blade number of any other steps. However, the step in this condition means an edge for perforating a work piece including a last perforating edge to determine a diameter of the perforation of the work piece (and not include an edge for making a countersink). In this embodiment, the third step edge 30 is the last perforating edge.

(Condition 2)

The condition 2 is to increase a point angle of the first step edge than that of the other steps. When a diameter of a cutting edge (φD1 in an embodiment) is the same, an edge length becomes longer as the point angle becomes smaller. Thus the cutting resistance becomes smaller as the point angle becomes larger because total length of the blades that is in contact with a work piece becomes shorter. In the case where point angles of the edges at a second and subsequent steps are not the same, the point angle of the first edge have to be larger than the maximum point angle (θ2 in an embodiment) of any other steps. However, the step in this condition means a step edge for perforating a work piece including a last perforating edge to determine a diameter of the perforation of the work piece (and not include an edge for making a countersink).

(Condition 3)

The condition 3 is to increase a clearance angle of the first step edge than that of the other steps. The larger the clearance angle becomes, the smaller the cutting resistance becomes because the blade can cut a work piece sharply. In the case where clearance angles of the edges at a second and subsequent steps are not the same, the clearance angle of the first step edge have to be larger than the maximum clearance angle of any other steps. However, the step in this condition means a step edge for perforating a work piece including a last perforating edge to determine a diameter of the perforation of the work piece (and not include an edge for cutting a countersink).

(Single or Combination)

Only one condition may be applied among the above three conditions, or two or all of the conditions may be applied.

According to the drill A of an exemplary embodiment above explained, there are three stepped edges and each step has two, four and four blades from the tip, respectively. Thus the condition 1 is applied. Also the drill A of an exemplary embodiment has point angles θ1, θ2 and θ3 whose relation is θ1>θ2>θ3. Thus the condition 2 is applied.

The relation of γ1, γ2 and γ3 of the drill A is γ1≧γ2≧γ3. Even when the condition 3 is not applied, it is preferable to satisfy the relation γ1=γ2=γ3. Or the relation may be γ1=γ2>γ3. When applying the condition 3, the relation of γ1>γ2>γ3 or γ1>γ2=γ3 is preferable.

In the case where there are three or more stepped edges that are axially provided, it is preferable that two neighboring edges within the range of a second and subsequent steps satisfy following relations. One edge of two neighboring edges on the rear side has the same or more number of blades, the same or small point angle or the same or small clearance angle than that of the other edge adjacent on the tip side.

In an exemplary embodiment, the third edge 30 has the same blade number as the second edge 20 and has a small point angle than the edge 20. The clearance angle of the edge 30 has the same as or small clearance angle than the edge 20.

The distance h1 satisfies following conditions.

The distance h1 between the tip of the drill and the second edge 20 in the axis direction is the same as or more than the diameter φD1 of the first edge 10. By virtue of the structure, the metal material of the work piece becomes hard to contact with the second edge when the metal material returned toward rear direction of the drill by being released from the bending force.

In an exemplary embodiment, the point angle θ1 of the first edge 10 is set constant and the point angle θ2 of the second edge 20 is set constant. Therefore, both of ridges of the first edge 10 and the second edge 20 are straight.

The third edge 30 is the last perforating edge for enlarging the perforated hole and has a role to finish the hole with high precision. Therefore, preferably, a tip side portion of the edge 30 has a point angle close to the adjacent edge to the tip side, the edge 20, and has a point angle of zero at a rear end point so as to finish the perforation with fine surface roughness.

Therefore, the third edge 30 of an exemplary embodiment for final perforation has a point angle smaller than a point angle θ2 of the edge on the front side (second edge 20) at the front end of the edge 30 (corresponding to the position of diameter φD2), and the point angle decreases gradually as a ridge of the edge goes to rear end. As a result, the ridge of the edge 30 is smoothly curved and the point angle at the rear end (corresponding to the position of diameter φD3) is zero.

The ridge of the third edge 30 forms a smoothly curved line outwardly expanded and a tangent line of the curve declines gradually so as to close to the axis of the drill as the position shifts from the front end (φD2 position) to the rear end (φD3 position) of the drill. The tangent becomes parallel to the axis of the drill at the rear end position.

The difference between the minimum diameter φD2, at the front end of the third edge 30, and the maximum diameter φD3, at the rear end of the edge, is not less than 1 mm. The relation is expressed as (φD3−φD2)>1 mm. That is because the sufficient finishing work can be performed by the third edge 30.

The maximum diameter of the drill A of an exemplary embodiment is φD3. Nevertheless, it is possible to provide a cutting edge, not for perforation but for chamfering or countersinking, for example, having larger diameter than φD3 behind the last perforation edge.

Now a perforation of a work piece W, which is common to that explained in FIGS. 10 and 11, using the drill A of an exemplary embodiment will be explained. The work piece W is perforated from the fiber reinforced resin composite material W2, as explained in FIGS. 10 and 11, as the case using the conventional drill B having two blades having the same point angle. The work piece W is common such that the metal material W1 and the fiber reinforced resin composite material W2 are laminated. Other conditions such as the distance S between the holding tools CL are also the same and a perforation of the same diameter φD3 is assumed.

A perforation process using the drill A of an exemplary embodiment is shown in FIGS. 5 to 8. The comparative perforation process using the drill B has been explained using FIGS. 10 and 11.

Figure 9:
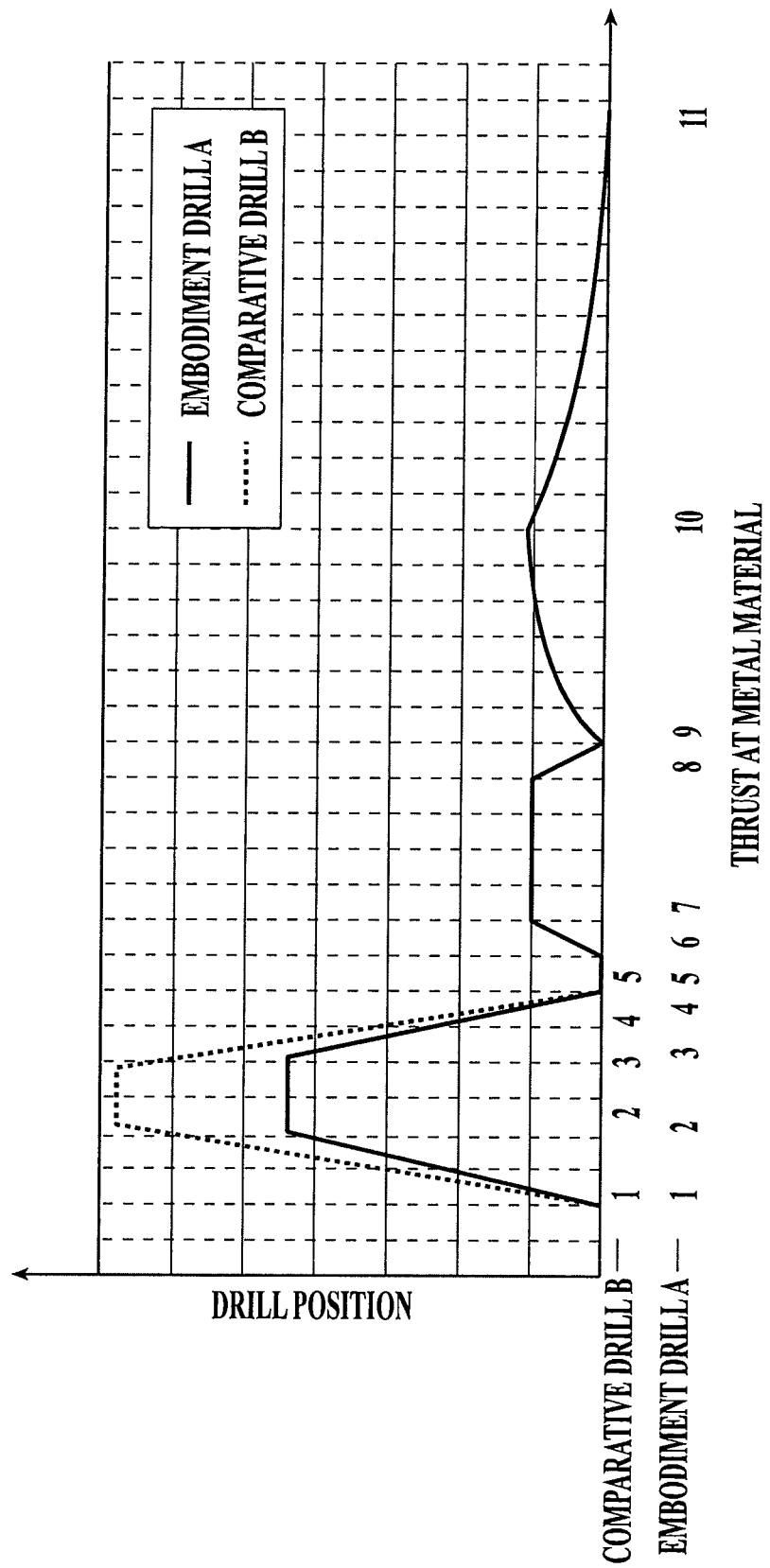
FIG. 9 is a graph of thrust resistance changes of drills in accordance with a drill position according to an exemplary embodiment of the invention and a comparative example.

FIG. 9 is a graph showing changes of thrust resistance during perforation processes of the metal material W1 using the drill A and the comparative drill B.

The vertical axis of the graph is a thrust resistance in relation to the perforation process of the metal material W1.

Figure 8A:
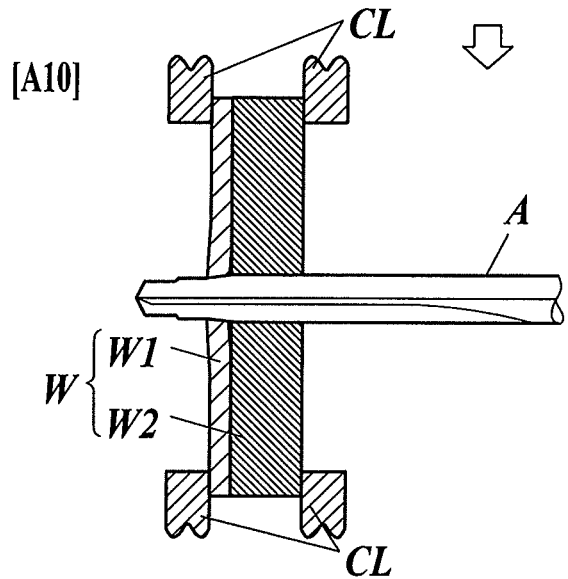
Figure 8B:
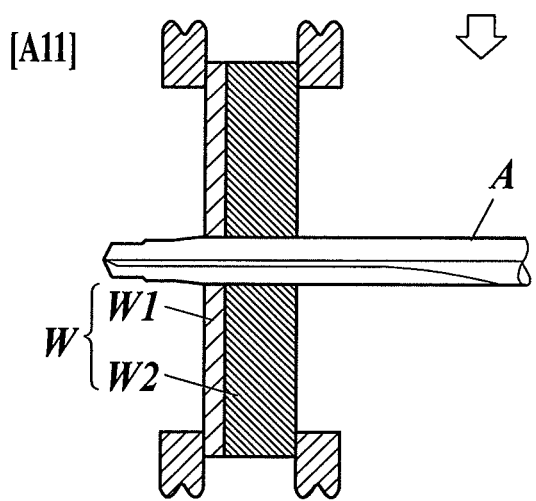

The horizontal axis of the graph is a position of the drill with respect to the work piece W. In the graph of FIG. 9, the number "1" of the drill A assigned at the horizontal axis corresponds to the position A1 shown by FIG. 5A. In the same manner, the number "2" of the drill A means the position A2 shown by FIG. 5B, and so on, and the last number "11" of the drill A means the position A11 as shown by FIG. 8B.

Figure 10A:
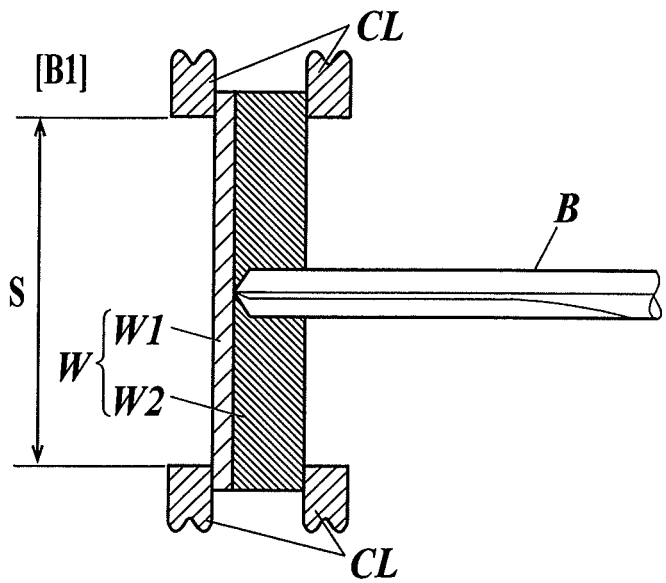
FIGS. 10A, 10B and 10C are cross-sectional drawings of a work piece during a perforation work sequence using a conventional drill.
Figure 10B:
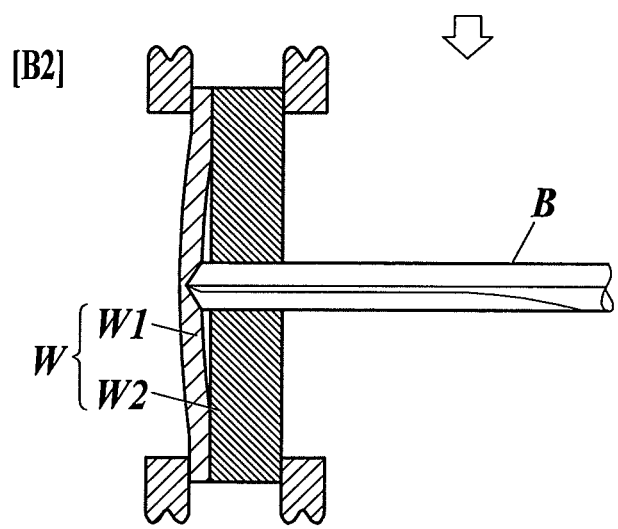
Figure 11A:
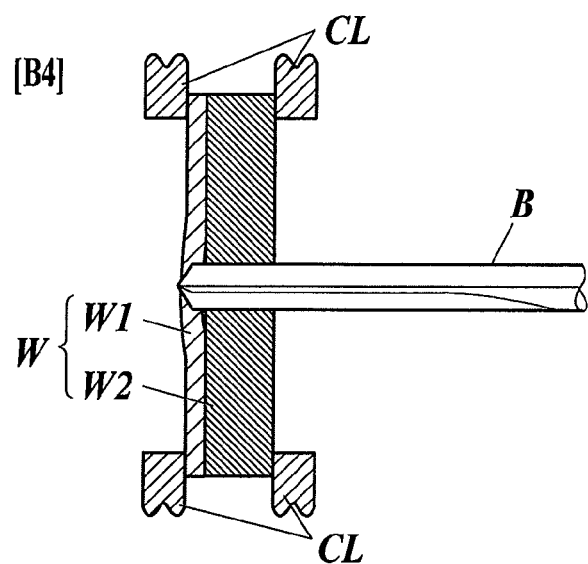
FIGS. 11A and 11B are cross-sectional drawings of a work piece during a perforation work sequence after FIGS. 10A-10C.
Figure 11B:
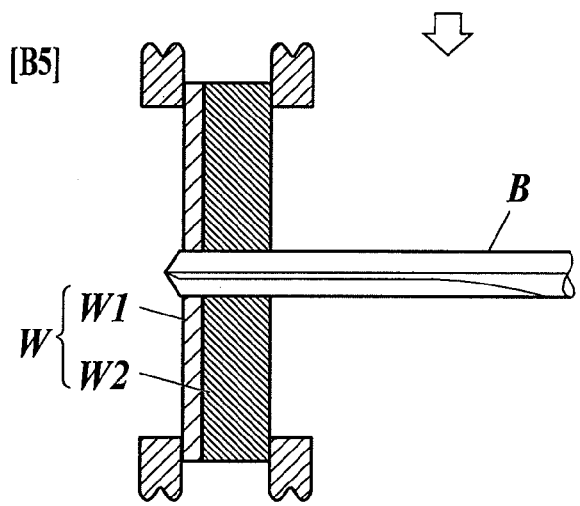

In the graph of FIG. 9, the number "1" of the drill B assigned at the horizontal axis corresponds to the position B1 shown by FIG. 10A. In the same manner, the number "2" of the drill B means the position B2 shown by FIG. 10B, and so on, and the last number "5" of the drill B means the position B5 as shown by FIG. 11B.

Such a drill position is designated as drill position "A4" or drill position "B2", and the like hereinafter.

In the graph of FIG. 9, the graph of the drill A is shown by a solid line and the graph of the drill B is shown by a dashed line.

In the case using the comparative drill B, the two blades having the same point angle perforate the work piece. The perforation process for the metal material W1 to make a hole of a diameter φD3 is completed by an advancing process from the drill position B1 to B5. The thrust resistance is comparatively large and the maximum thrust resistance is generated in the advancing step from the drill position B2 to B3 because most part of the cutting edge is in contact with the metal material W1 at the step.

Figure 5A:
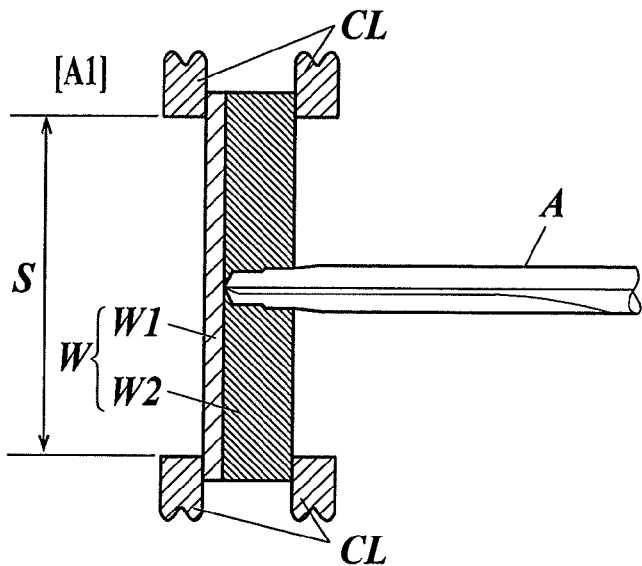
FIGS. 5A-5C, FIGS. 7A, 7B and 7C are cross-sectional drawings of a work piece during a perforation work sequence after
Figure 5B:
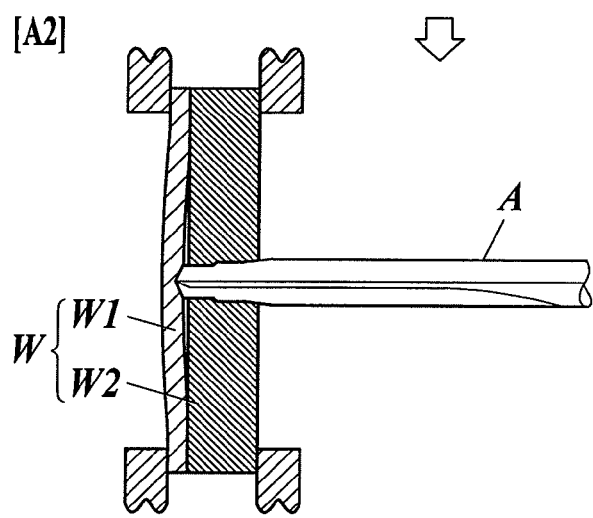
Figure 5C:
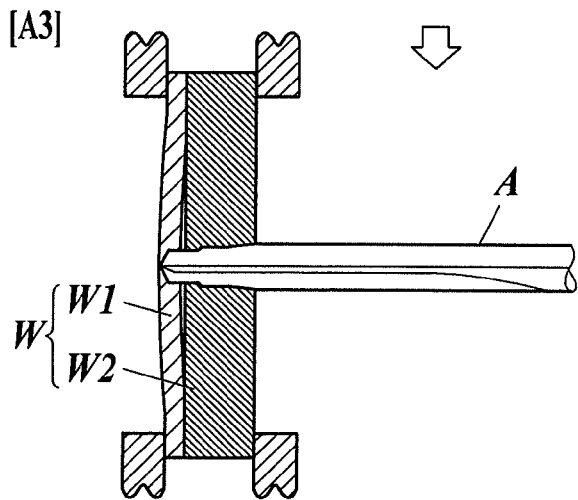
Figure 6A:
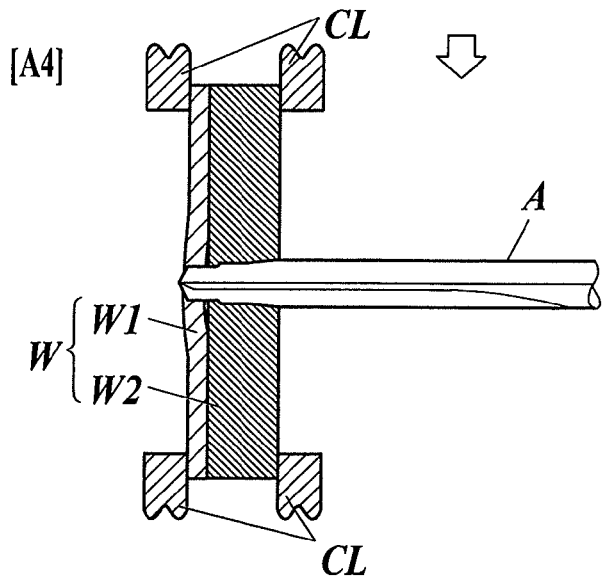
FIGS. 6A, 6B and 6C are cross-sectional drawings of a work piece during a perforation work sequence after
Figure 6B:
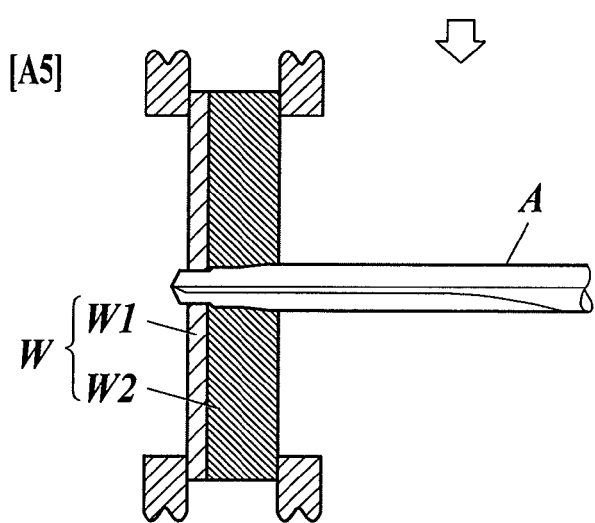
Figure 6C:
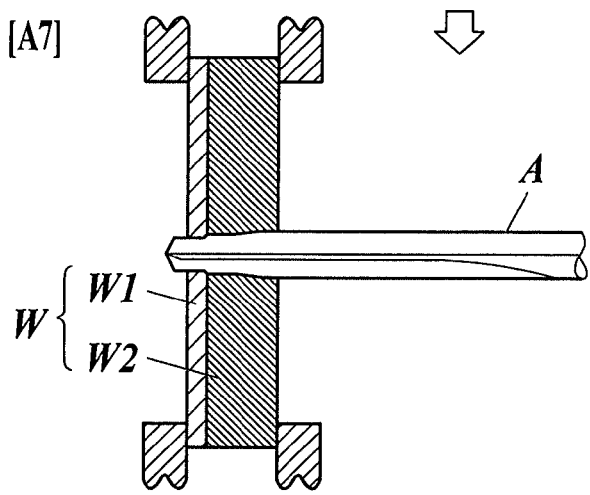
Figure 7A:
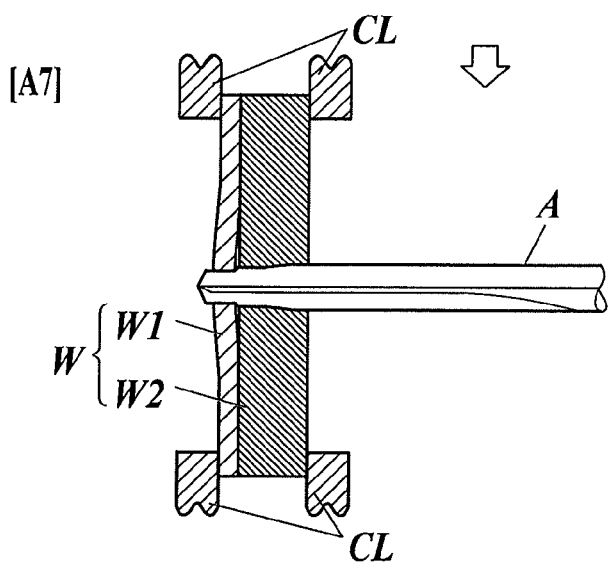
Figure 7B:
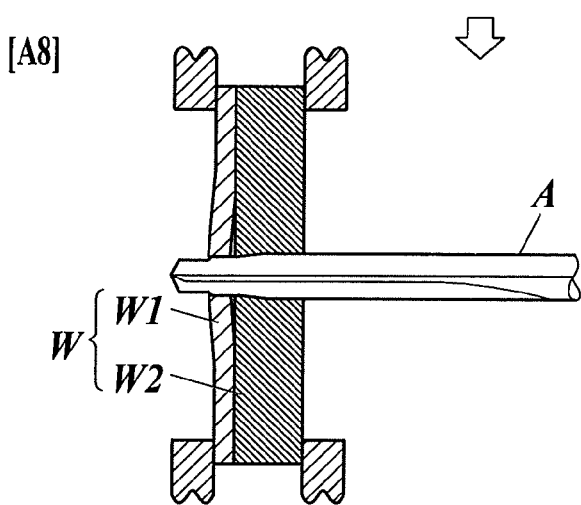
Figure 7C:
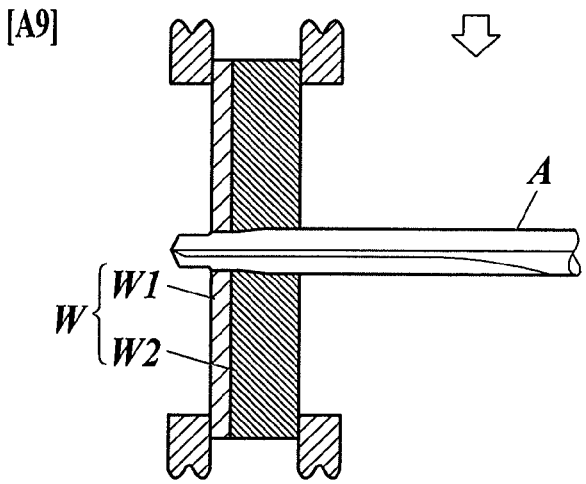
Figure 10C:
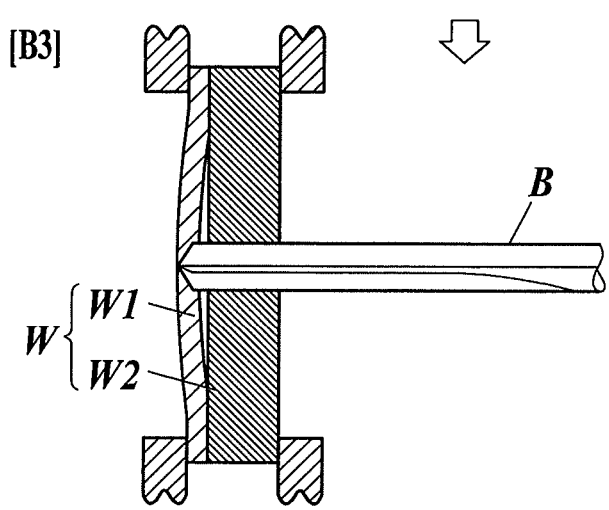

On the other hand, according to the drill A of an embodiment, the first step edge 10 perforates the metal material W1 to make a hole of a diameter φD1 at an advancing step from the drill position A1 to A5 that has the same distance as the advancing step from the drill position B1 to B5. Therefore, the thrust resistance to the first edge 10 is smaller than that to the drill B. Thus the bending of the metal material W1 becomes smaller as shown in FIGS. 5B and 5C compared with that by the drill B (FIGS. 10B and 10C).

As a result, the risk that the drill A is stopped or the second edge is damaged by sharply increased load to the edge can be prevented. That is because even when the metal material W1 returned to the original position at the drill position A4 or A5 because of recovery from the bending, the maximum bending is smaller and the second edge 20 is apart from the tip of the drill in the distance h1.

After that, the second edge 20 starts perforation of the metal material W1 from the drill position A6. The second edge 20 enlarges the diameter of the hole of the metal material W1 from φD1 to φD2 at the advancing step from the drill position A6 to A9. Subsequently the third edge 30 enlarges the diameter of the hole from φD2 to φD3 at the advancing step from the drill position A9 to A11 so as to finish the perforation with high size precision and surface precision.

The thrust resistances to the second edge 20 and the third edge 30 are smaller than that to the first edge 10 because the amount of cutting by the second edge 20 (φD2−φD1) and by the third edge 30 (φD3−φD2) are smaller than the amount (φD1) by the first edge 10.

Because the edge of the drill A is axially divided into three steps, drill cuttings are finely shredded and ejected smoothly.

When using a drill that has no second edge 20, the amount of cutting (φD2−φD1) by the edge 20 shall be distributed to the first edge 10 and/or the third edge 30. However, if the diameter of the first edge 10 be changed to φD2, the thrust resistance to the edge 10 will become large and the bending of the metal material W1 will also become large. It may be possible to increase the minimum diameter of the third edge 30 up to φD1. It is preferable to enlarge the diameter of the perforation by 1 mm or more by the edge 30 so as to perform sufficient finishing. However, too much enlargement more than 1 mm may cause too large cutting resistance and poor finishing precision.

When cutting the work piece W by the edge 30, it becomes possible to perforate and finish the hole with high precision by holding and guiding the axis of the edge 30 with high precision by virtue of centripetal force of the preceding second edge 20 having four blades. In the case where there is no second edge 20, a preceding edge of the edge 30 is the edge 10; however, the edge 10 is a two-bladed edge and has a poor axis holding capability compared with a four-bladed edge.

The drill of an exemplary embodiment above explained has straight flutes; however, a spiral flute may also be available, of course.

In above embodiment, there is one intermediate edge between the first edge and the last edge. However, no intermediate step or two or more intermediate steps may be provided in accordance with a diameter of perforation.

Figure 12:
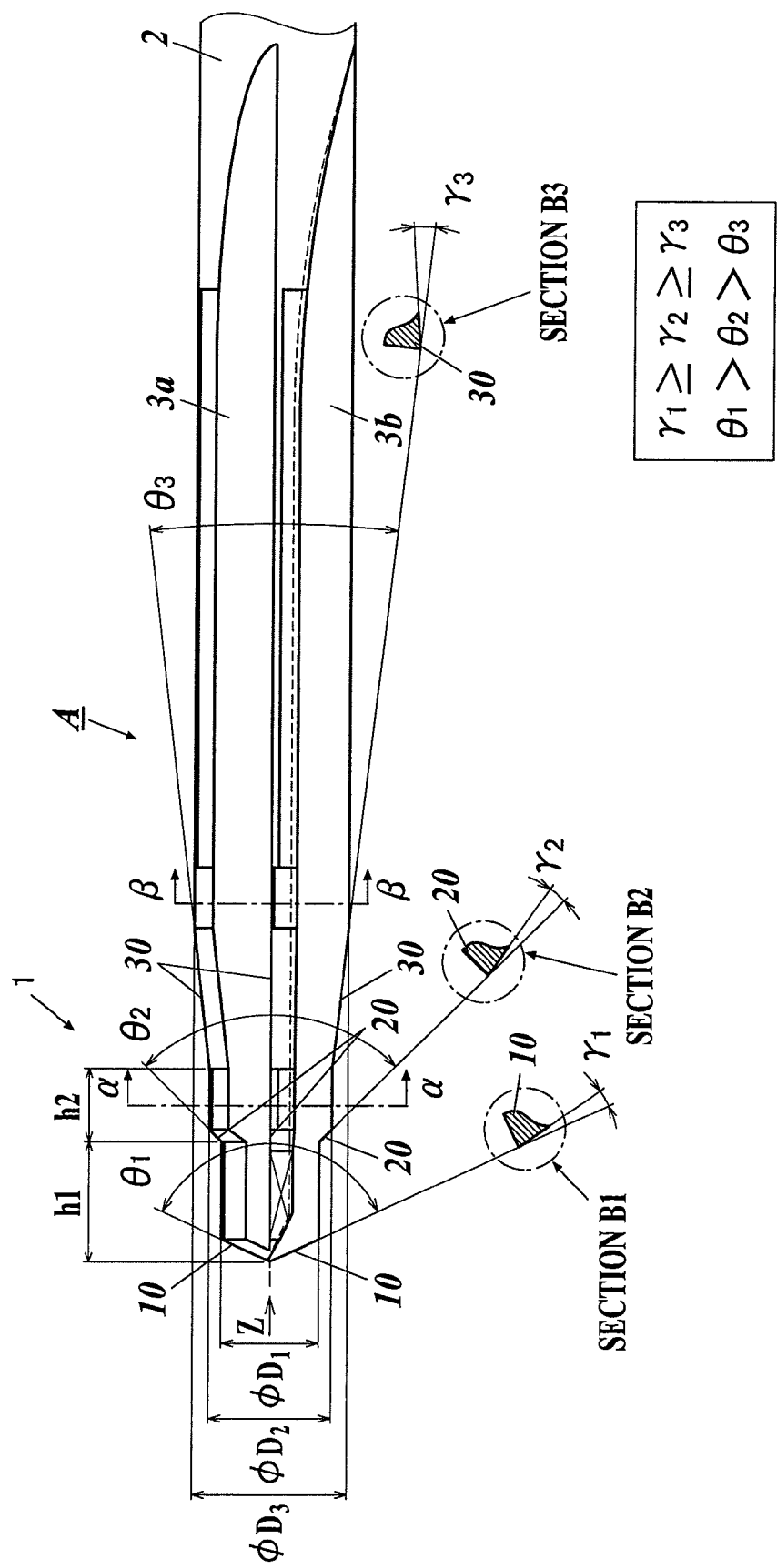
FIG. 12 is a side view from X direction in FIG. 1, and sections B1, B2 and B3 in FIG. 12 are sectional drawings of a first-step cutting edge, second-step cutting edge and third-step cutting edge, respectively, exhibiting a modification of the present invention in which a ridge line of the third-step cutting edge is linear.

In addition, the ridge of the third edge of an exemplary embodiment is formed in a smooth curve in which a point angle is gradually decreased from the tip side to the rear side and the point angle at the rear end is zero. However, it may be possible to make the point angle constant and the ridge of the third edge may be straight, as shown in FIG. 12, like the second edge.

The drill of the present invention may be applied effectively to perforate a work piece made of fiber reinforced resin composite material only or metal material only.

What is claimed is:

1. A step-shaped drill bit comprising at least two stepped sections that are axially provided, wherein
a cutting edge of a first stepped section from a tip has a point angle that is larger than a point angle of a cutting edge of a second stepped section, and
a cutting edge of the first stepped section has a circumferential clearance angle that is larger than a circumferential clearance angle of a cutting edge of the second stepped section.

2. The drill bit as claimed in claim 1 comprising at least three stepped sections that are axially provided, wherein
each of the second and subsequent stepped sections satisfies at least one condition selected from the group consisting of:
having the same or larger number of blades than a neighboring stepped section on the tip side,
comprising a cutting edge having the same or smaller point angle than a cutting edge of a neighboring stepped section on the tip side, and
comprising a cutting edge having the same or smaller circumferential clearance angle than a cutting edge of a neighboring stepped section on the tip side.

3. The drill bit as claimed in claim 1 comprising at least three stepped sections that are axially provided, wherein
each of the second and subsequent stepped sections satisfies at least one condition selected from a group consisting of:
having a larger number of blades than a neighboring stepped section on the tip side,
comprising a cutting edge having a smaller point angle than a cutting edge of a neighboring stepped section on the tip side, and
comprising a cutting edge having a smaller circumferential clearance angle than a cutting edge of a neighboring stepped section on the tip side.

4. The drill bit as claimed in claim 1, wherein an axial distance between the tip of the drill bit and the second stepped section is the same as or larger than a diameter of the first stepped section.

5. The drill bit as claimed in claim 1, wherein the first stepped section is two-bladed.

6. The drill bit as claimed in claim 1, wherein the second stepped section is four-bladed.

7. The drill bit as claimed in claim 1, comprising a third stepped section having four blades.

8. The drill bit as claimed in claim 1, wherein
a last stepped section comprises a cutting edge for finally enlarging a perforated hole has a point angle, at a front end thereof, that is smaller than a point angle of a cutting edge of a stepped section closer to the tip of the drill bit, and
the point angle of the cutting edge of the last stepped section decreases gradually along a front-rear direction such that the cutting edge of the last stepped section has a smoothly curved profile.

9. The drill bit as claimed in claim 8, wherein a point angle at a rear end of the cutting edge of the last stepped section is zero.

10. The drill bit as claimed in claim 9, wherein a diameter of the drill at the position where the point angle is zero is a maximum diameter of the drill bit.

11. The drill bit as claimed in claim 8, wherein the last stepped section is a third stepped section of the drill bit.

12. The drill bit as claimed in claim 1, wherein the first stepped section comprises a number of blades and a number of flutes arranged between adjacent blades.

13. The drill bit as claimed in claim 1, wherein the cutting edge of the second stepped section comprises a ridgeline having a minimum diameter at a front end and a maximum diameter at a rear end.

14. The drill bit as claimed in claim 1, further comprising a third stepped section, wherein the second stepped section comprises a number of blades, the third stepped section comprises a number of blades, and the number of blades of the third stepped section is the same as the number of blades of the second stepped section.

15. The drill bit as claimed in claim 1, wherein
the second stepped section comprises a first set of blades and a second set of blades, the second set of blades being oriented at a 90° orientation from the first set of blades, and
in an axial cross-section, the profile of the first set of blades differs from the profile of the second set of blades.

16. The drill bit as claimed in claim 1, further comprising a cutting edge of a third stepped section, wherein a length from the tip of the drill bit to a front end point of the cutting edge of the second stepped section is greater than a length from the front end point of the cutting edge of the second stepped section to a front end point of the cutting edge of the third stepped section.

17. A method for perforating a fiber reinforced resin composite material comprising
drilling a work piece including a fiber reinforced resin composite material with the drill bit as claimed in claim 1.

18. A step-shaped drill bit comprising at least two stepped sections that are axially provided, wherein
a cutting edge of a first stepped section from a tip has a point angle that is larger than a point angle of a cutting edge of a second stepped section, and
a cutting edge of the first stepped section has a circumferential clearance angle that is larger than a circumferential clearance angle of a cutting edge of the second stepped section, wherein
a cutting edge of a last stepped section for finally enlarging a perforated hole has a point angle, at a front end thereof, that is smaller than a point angle of a cutting edge of a stepped section closer to the tip of the drill bit,
the point angle of the cutting edge of the last stepped section decreases gradually along a front-rear direction such that the cutting edge of the last stepped section has a smoothly curved profile,
the point angle at a rear end of the cutting edge of the last stepped section is zero, and
a difference of a minimum diameter at a front end of the cutting edge of the last stepped section and a maximum diameter at the rear end of the cutting edge of the last stepped section is not less than 1 mm.

19. A step-shaped drill bit comprising at least two stepped sections that are axially provided, wherein
a cutting edge of a first stepped section from a tip has a point angle that is larger than a point angle of a cutting edge of a second stepped section,
a cutting edge of the first stepped section from the tip has a circumferential clearance angle that is larger than a circumferential clearance angle of a cutting edge of the second stepped section, and the first stepped section has a fewer number of blades than the number of blades at the second stepped section.

20. A step-shaped drill bit comprising at least two stepped sections that are axially provided, wherein a cutting edge of a first stepped section from a tip has a circumferential clearance angle that is larger than a circumferential clearance angle of a cutting edge of a second stepped section, and the first stepped section has a fewer number of blades than the number of blades at the second stepped section.

\* \* \* \* \*